(12) United States Patent
Hirata et al.

(10) Patent No.: US 8,757,197 B2
(45) Date of Patent: Jun. 24, 2014

(54) AUTOMATIC PRESSURE REGULATOR FOR FLOW RATE REGULATOR

(75) Inventors: Kaoru Hirata, Osaka (JP); Katsuyuki Sugita, Osaka (JP); Kouji Nishino, Osaka (JP); Ryousuke Dohi, Osaka (JP); Nobukazu Ikeda, Osaka (JP)

(73) Assignee: Fujikin Incorporated, Osaka (JP)

( * ) Notice: Subject to any disclaimer, the term of this patent is extended or adjusted under 35 U.S.C. 154(b) by 289 days.

(21) Appl. No.: 12/996,370

(22) PCT Filed: Apr. 6, 2009

(86) PCT No.: PCT/JP2009/001591
§ 371 (c)(1),
(2), (4) Date: Feb. 23, 2011

(87) PCT Pub. No.: WO2009/147775
PCT Pub. Date: Dec. 10, 2009

(65) Prior Publication Data
US 2011/0139271 A1 Jun. 16, 2011

(30) Foreign Application Priority Data

Jun. 4, 2008 (JP) .................................. 2008-146498

(51) Int. Cl.
*F16K 31/02* (2006.01)
(52) U.S. Cl.
USPC ....................................... 137/487.5; 700/282
(58) Field of Classification Search
USPC ....................................... 137/487.5; 700/282
See application file for complete search history.

(56) References Cited

U.S. PATENT DOCUMENTS

| | | | |
|---|---|---|---|
| 6,138,708 A * | 10/2000 | Waldbusser | 137/341 |
| 6,289,923 B1 | 9/2001 | Ohmi et al. | |
| 6,537,037 B2 * | 3/2003 | Ota et al. | 417/213 |
| 6,644,332 B1 * | 11/2003 | Winkler | 137/2 |

(Continued)

FOREIGN PATENT DOCUMENTS

| | | |
|---|---|---|
| JP | 55-083901 | 6/1980 |
| JP | 7-240375 | 9/1995 |

(Continued)

OTHER PUBLICATIONS

International Search Report issued in corresponding International Application No. PCT/JP2009/001591, completed Apr. 17, 2009, mailed Apr. 28, 2009.

(Continued)

*Primary Examiner* — William McCalister
(74) *Attorney, Agent, or Firm* — Griffin & Szipl, P.C.

(57) ABSTRACT

The invention prevents overshoot from occurring in flow rate on the output side of a flow rate regulator when output flow rate is changed or the gas type distributed is changed. Thus, an automatic pressure regulator is provided to supply gas pressure to a flow rate regulator that includes a piezoelectric element driving type pressure regulating valve, a control pressure detector provided on the output side of the pressure regulating valve, and a controller to which a detected value $P_2$ of the control pressure detector and a set value Pst for control pressure are input, wherein the controller supplies a control signal to a piezoelectric element driving unit of the pressure regulating valve using a proportional control system to perform valve opening regulation in which the proportional control system of the controller is set to control to bring about a residual deviation in control pressure by disabling an integral action.

7 Claims, 10 Drawing Sheets

(56) References Cited

U.S. PATENT DOCUMENTS

| | | | | |
|---|---|---|---|---|
| 6,848,470 | B2* | 2/2005 | Ohmi et al. | 137/487.5 |
| 7,273,063 | B2* | 9/2007 | Lull et al. | 137/12 |
| 7,287,541 | B2* | 10/2007 | McMurtrey et al. | 137/14 |
| 2002/0092564 | A1 | 7/2002 | Ollivier | |
| 2008/0099069 | A1* | 5/2008 | Cook | 137/14 |

FOREIGN PATENT DOCUMENTS

| | | |
|---|---|---|
| JP | 11-345027 | 12/1999 |
| JP | 2003-120832 A | 4/2003 |
| JP | 2003-529218 | 9/2003 |
| JP | 2005-339439 | 12/2005 |

OTHER PUBLICATIONS

M. Araki, "PID Control", Control Systems, Robotics, and Automation, vol. II, Kyoto University, Japan.

What does PID Stand for?, downloaded from the webpage of www.abbreviations.com/PID, dated Nov. 8, 2010, pp. 1-2.

What does SCCM Stand for?, downloaded from the webpage of www.abbreviatiions.com/SCMM, dated Nov. 5, 2010, p. 1.

"PID for Dummies," at http://www.csimn.com/CSI_pages/PIDforDummies.html (downloaded Nov. 29, 2013), which corresponds to Exhibit B.

\* cited by examiner

AUTOMATIC PRESSURE REGULATOR FOR FLOW RATE REGULATOR

This is a National Phase Application in the United States of International Patent Application No. PCT/JP2009/001591 filed Jun. 4, 2009, which claims priority on Japanese Patent Application No. 2008-146498, filed Jun. 4, 2008. The entire disclosures of the above patent applications are hereby incorporated by reference.

TECHNICAL FIELD OF THE INVENTION

The present invention relates to an automatic pressure regulator for a flow rate regulator for a gas supply unit, which supplies gas to a chamber for semiconductor manufacturing, or the like. In particular, the present invention relates to an automatic pressure regulator for a flow rate regulator that is capable of almost entirely preventing overshoot from occurring in flow rate output of the flow rate regulator at the time of switching the supply gas flow rate, or the like.

BACKGROUND OF THE INVENTION

In a gas supply unit in a semiconductor manufacturing apparatus, or the like, as shown in FIG. 13, conventionally, a pressure regulator R is provided in a gas supply line from a gas supply source SG and a plurality of branch pipe passages La, Lb, and Lc are provided to branch off a gas supply pipe passage Lo on the output side of the pressure regulator R. Additionally, automatic pressure regulators $5a$, $5b$, and $5c$, respectively, composed of regulators $1a$, $1b$, and $1c$, inlet side pressure sensors $2a$, $2b$, and $2c$, outlet side pressure sensors $3a$, $3b$, and $3c$, and controllers $4a$, $4b$, and $4c$, and thermal type mass flow rate regulators $MFC_1$, $MFC_2$, and $MFC_3$, are provided in the respective branch pipe passages La, Lb, and Lc. When pressure differences $\Delta P$ between the inlet side pressure sensors $2a$, $2b$, and $2c$ and the outlet side pressure sensors $3a$, $3b$, and $3c$ of the respective thermal type mass flow rate regulators $MFC_1$, $MFC_2$, and $MFC_3$ are out of a range of set values, automatic control is performed so as to apply feedback to the regulators $1a$, $1b$, and $1c$ via the controllers $4a$, $4b$, and $4c$, and the outlet side pressures of the respective regulators $1a$, $1b$, and $1c$ are regulated to bring the above-described pressure differences $\Delta P$ to be within the set values so that gas, at a set flow rate, may be stably supplied to respective targets $6a$, $6b$, and $6c$ that use the gas.

Furthermore, the control provided by the respective controllers $4a$, $4b$, and $4c$ is provided with characteristics of a so-called proportional-integral-derivative control action or "PID control action," which is provided with an auto-tuning function that automatically tunes amounts of the respective control actions of a proportional control action (P control action), an integral control action (I control action), and a derivative control action (D control action) in order to promptly converge pressure differences (deviations) $\Delta P$, between the inlet side pressure sensors $2a$, $2b$, and $2c$ and the outlet side pressure sensors $3a$, $3b$, and $3c$, to zero in a shorter cycle.

The conventional automatic pressure regulators $5a$, $5b$, and $5c$ shown in FIG. 13 are capable of highly accurately controlling gas flow rates to be supplied to vacuum chambers serving as the target $6a$, $6b$, and $6c$ using gas, and are capable of relatively rapidly converging the gas flow rates to a new set flow rate even in the case where supply gas flow rates are changed, in order to provide an excellent practical utility.

However, there are many problems remaining to be solved in the automatic pressure regulators $5a$, $5b$, and $5c$ shown in FIG. 13. As one problem to be urgently solved, among those problems remaining, is the problem that, when the gas flow is made intermittent by the automatic pressure regulators $5a$, $5b$, and $5c$ at the time gas is supplied at a flow rate of approximately 10 to 1000 Standard Cubic Centimeters per Minute (SCCM) to the vacuum chambers $6a$, $6b$, and $6c$ ($10^{-1}$ to $10^{-5}$ torr), so-called "overshoot" occurs in the flow rate on the outlet sides of the thermal type mass flow rate regulators $MFC_1$, $MFC_2$, and $MFC_3$ at the start of gas supply, which brings about fluctuation in film density, film thickness, and the like, during semiconductor manufacturing. This results in difficulty with respect to forming films with a uniform film quality in a deposition system, or the like, in which the gas type to be supplied must be switched sharply.

Patent Document 1: Japanese Published Unexamined Patent Application No. 7-240375
Patent Document 2: Japanese Published Unexamined Patent Application No. 2005-339439

Problems to be Solved by the Invention

The present invention solves the problem as described above and encountered in the conventional automatic pressure regulators $5a$, $5b$, and $5c$, i.e., a phenomenon pertaining to so-called overshoot in the flow rate that occurs in the thermal type mass flow rate regulators $MFC_1$, $MFC_2$, and $MFC_3$ due to the control characteristics of the controllers $4a$, $4b$, and $4c$ and the flow rate control characteristics of the regulators $1a$, $1b$, and $1c$ at the time of switching the gas flow rate setting, wherein the overshoot particularly occurs at the start of gas supply. Thus, it is an object of the present invention to provide an automatic pressure regulator for a flow rate regulator by which it is possible to perform highly accurate flow rate control using a thermal type mass flow rate regulator without "overshoot" occurring, even in the case of flow rate control for gas at a low flow rate.

Means for Solving the Problems Discussed Above

First, the inventors and others prepared a test apparatus, as shown in FIG. 1, which employed a manual pressure regulator 40 and a thermal type mass flow rate regulator 17, and researched the flow rate responsiveness of the manual pressure regulator 40. That is, the inventors and others set a set value Pst for control pressure in the manual pressure regulator 40 in order to research the step response and stability of flow rate output of the thermal type mass flow rate regulator 17 at that time.

In FIG. 1, reference numeral 10 denotes a $N_2$ gas supply source, reference numeral 11 denotes a manual pressure regulator, reference numeral 12 denotes a filter, reference numeral 13 denotes a supply pressure detector, reference numeral 14 denotes a control pressure detector, reference numeral 17 denotes a thermal type mass flow rate regulator, reference numerals 18 and 19 denote valves, reference numeral 40 denotes a manual pressure regulator, and reference numeral 21 denotes a vacuum pump.

A $N_2$-filled container is used as the $N_2$ gas supply source 10 for the test apparatus of FIG. 1, and an ERSB-2069-WE (manufactured by Yutaka Eng. Corp.) is used as the manual pressure regulator 11. Furthermore, an SQMICROHF502PUPG6010 (manufactured by Parker Hannifin Corp.) is used as the manual pressure regulator 40, and moreover, an FC-D98CT-BF (manufactured by Aera Corp., F.S. 50 SCCM) is used as the thermal type mass flow rate regulator 17.

In detail, the respective devices are connected together to form the test apparatus of FIG. 1. Next, the vacuum pump 21 is driven to vacuum the secondary side of the thermal type mass flow rate regulator 17. Subsequently, the supply pressure of the manual pressure regulator 11 and the control pressure of the manual pressure regulator 40 are, respectively, set to 300 kPaG and 280 kPa (abs).

Then, the step responses on the input side and the output side of the thermal type mass flow rate regulator 17 are measured by a data logger, and the control pressure of the manual pressure regulator 40 is measured in the same way. The data logger of the device NR-600 (manufactured by Keyence Corp.) is used for measuring the step responses on the input and output sides of the thermal type mass flow rate regulator 17, and is used for measuring the control pressure of the manual pressure regulator 40.

FIG. 2 shows the flow rate response characteristics of the manual pressure regulator 40 as collected in the above-described test, which shows the control pressure of the manual pressure regulator 40 and the step response characteristics on the input and output sides of the thermal type mass flow rate regulator 17. That is, in FIG. 2, curve A shows values of flow rate input (voltage values) and curve B shows values of flow rate output (voltage values) of the thermal type mass flow rate regulator 17. It was found that, in the case of the manual pressure regulator 40, overshoot at the time of starting up of the thermal type mass flow rate regulator 17 is 0.8% of a full-scale (F.S.) flow rate, which is extremely low as is clear from the enlarged portion C. Furthermore, in the case of the manual pressure regulator 40, it was found that a deviation is brought about in the control pressure between a rest time and a dynamic pressure time as shown by curve D, and this deviation in the control pressures during a rest time (at a flow rate of 0 SCCM) and a dynamic pressure time (at a flow rate of 50 SCCM) is approximately 5 kPa.

Next, with respect to the case where the manual pressure regulator 40, shown in FIG. 1, is replaced with an automatic pressure regulator 20 provided with a PID control action, which is composed of a pressure regulating valve 15 and a controller 16 as shown in FIG. 3, the control pressure of the automatic pressure regulator 20 and the step response characteristics on the input and output sides of the thermal type mass flow rate regulator 17 were researched in the same way as in FIG. 2. In other words, FIG. 2 provides test data collected by the test apparatus shown in FIG. 1, and FIG. 4 provides test data collected by the test apparatus shown in FIG. 3.

Because automatic control with a PID control action is performed by the controller 16 in the automatic pressure regulator 20, a deviation of the control pressures hopefully becomes zero eventually. Thus, the test apparatuses shown in FIGS. 1 and 3 are similar, except that FIG. 1 employs manual pressure regulator 40 and related structures, and FIG. 3 employs automatic pressure regulator 20.

FIG. 4 shows the results obtained when using the apparatus of FIG. 3. Because a PID control action is performed by the controller 16, the control pressure of the automatic pressure regulator 20 is, as shown by curve D, regulated in directions of offsetting the deviation. As a result, it was found that the value of flow rate output of the thermal type mass flow rate regulator 17 is as shown by curve B, and, as is clear from the enlarged portion C, overshoot of approximately 7.8% of the full-scale (F.S.) flow rate occurs. In other words, it was found that, when the control pressure of the automatic pressure regulator 20 is controlled by automatic feedback control, to which a PID control action is applied by the controller 16, larger overshoot occurs in the output value of the thermal type mass flow rate regulator 17 at the time of starting up a gas flow rate than when the manual pressure regulator 40 is used.

SUMMARY OF THE INVENTION

The present invention was developed on the basis of the above-described finding. It was conceived, then, that overshoot occurring in the output of the thermal type mass flow rate regulator 17, at the time of starting up a gas flow rate, is prevented by adjusting the control characteristics of the controller 16, which feedback-controls the pressure regulating valve 15 of the automatic pressure regulator 20. On the basis of this concept, the flow rate response characteristics tests for the pressure regulating valve 15 and the thermal type mass flow rate regulator 17 was carried out with respect to a large number of automatic pressure regulators 20.

The present invention has been developed on the basis of the results of the flow rate response characteristics tests discussed above. The present invention, according to a first aspect, provides an automatic pressure regulator 20 for supply pressure of gas to be supplied to a flow rate regulator, and has the basic configuration that the automatic pressure regulator 20 includes a pressure regulating valve 15, a control pressure detector 14 provided on the output side of the pressure regulating valve 15, and a controller 16 to which a detected value $P_2$ of the control pressure detector 14 and a set value Pst for control pressure are input, wherein the controller 16 supplies a control signal Q to a driving unit of the pressure regulating valve 15 by using a proportional control system to perform opening regulation of the valve, and the proportional control system is control provided with a proportional action for bringing about a residual deviation in control pressure.

It is preferable that a piezoelectric element driving type metal diaphragm valve is used as the pressure regulating valve 15.

It is preferable that a flow rate regulator, which supplies gas to a vacuum chamber, is used as the flow rate regulator.

It is preferable that the range of the control pressure of the pressure regulating valve 15 is from −0.07 to 0.7 MPaG, and the minimum rated flow rate of the thermal type mass flow rate regulator 17 is 1 SCCM.

It is preferable that the proportional control system is control provided with a proportional action for bringing about a residual deviation in control pressure by disabling an integral control action from a state in which PID control is enabled.

Effects of the Invention

In accordance with the present invention, the control system of the controller 16 of the automatic pressure regulator 20 is set to control for bringing about a residual deviation in control pressure by disabling an integral action, in order to prevent overshoot from occurring in the response characteristics on the output side of the flow rate regulator. As a result, in gas supply at a minute flow rate, overshoot at the time of changing gas flow rate, or at the time of switching a supply gas type, is prevented. Moreover in a semiconductor manufacturing apparatus, or the like, it is possible to considerably improve the product quality and increase its production yield.

Thus, in accordance with a first embodiment of the present invention, an automatic pressure regulator for supply pressure of gas to be supplied to a flow rate regulator is provided, wherein the automatic pressure regulator for the flow rate regulator comprises: (a) a pressure regulating valve; (b) a control pressure detector provided on the output side of the pressure regulating valve; and (c) a controller to which a detected value $P_2$ of the control pressure detector and a set value Pst for control pressure are input, wherein the controller supplies a control signal to a driving unit of the pressure regulating valve by a proportional control system to perform an opening regulation of the valve, wherein the proportional control system is control with a proportional action for bringing about a residual deviation in control pressure. In accordance with a second embodiment of the present invention, the first embodiment is modified so that the pressure regulating valve is a piezoelectric element driving type metal diaphragm valve. In accordance with a third embodiment of the present invention, the first embodiment is modified so that the flow rate regulator is a flow rate regulator that supplies gas to a vacuum chamber. In accordance with a fourth embodiment of the present invention, the first embodiment is modified so that the range of the control pressure of the pressure regulating valve is from −0.07 to 0.7 MPaG, and the minimum rated flow rate of the flow rate regulator is 1 SCCM (Standard Cubic Centimeters per Minute). In accordance with a fifth embodiment of the present invention, the first embodiment is modified so that the proportional control system is control with a proportional action for bringing about a residual deviation in control pressure by disabling an integral control action from a state in which PID control is enabled.

BRIEF DESCRIPTIONS OF THE DRAWINGS

DESCRIPTION OF SYMBOLS

A: flow rate input value of a thermal type mass flow rate regulator (MFC), B: flow rate output value of the thermal type mass flow rate regulator (MFC), C: enlarged portion, D: control pressure of manual pressure regulator or control pressure of pressure control valve of automatic pressure regulator, Pst: set value for control pressure, 10: $N_2$ gas supply source, 11: pressure regulator, 12: filter, 13: supply pressure detector, 14: control pressure detector, 15: pressure regulating valve (regulator), 16: controller, 17: thermal type mass flow rate regulator, 18, 19: valves, 20: automatic pressure regulator for flow rate regulator (automatic regulator), 21: vacuum pump, 22: valve main body, 22a: hole part of valve main body, 23: diaphragm valve element, 24: presser adapter, 25: diaphragm presser, 26: piezoelectric element support tube body, 27: disc spring, 28: split base, 29: tube body fixing/guiding body, 30: lower part receiving stand, 31: piezoelectric element, 32: bearing, 33: positioning member, 34: gauge pressure sensor, 35: long gasket, 36: fluid inlet, 37: fluid outlet, 38: leak test hole, 39: valve seat, 40: manual pressure regulator.

DETAILED DESCRIPTION AND BEST MODE FOR CARRYING OUT THE INVENTION

Figure 1:
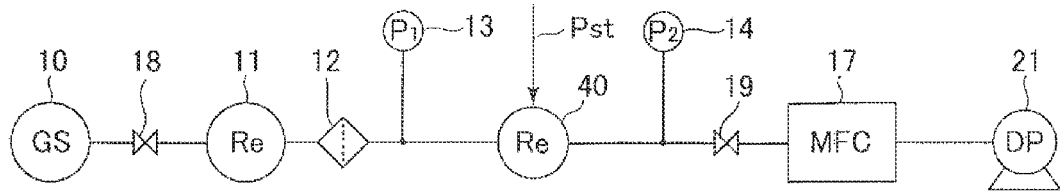
FIG. 1 is an explanatory diagram of a flow rate response characteristics measuring device for a thermal type mass flow rate regulator using a manual pressure regulator.
Figure 2:
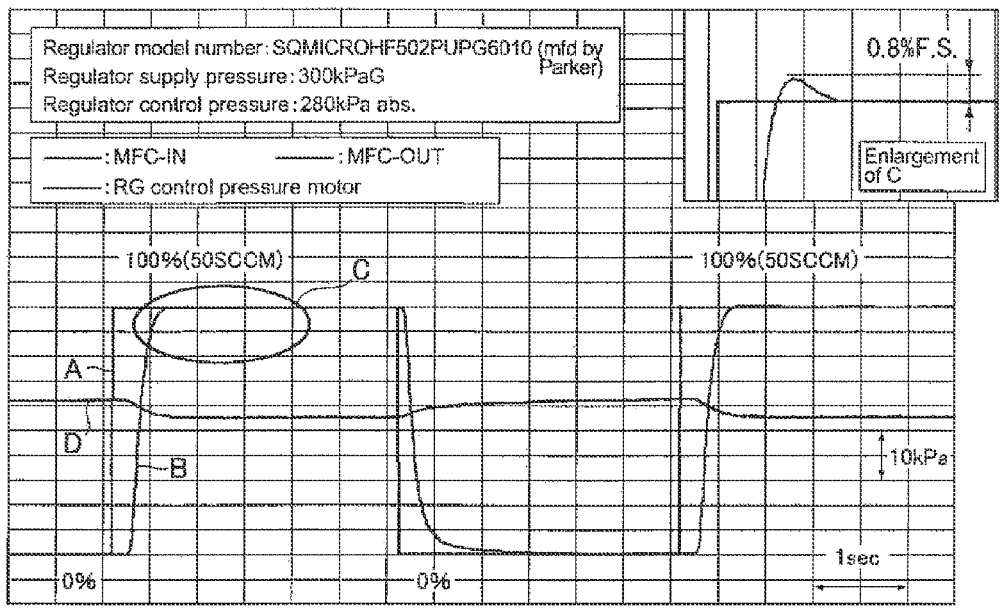
FIG. 2 is a diagram showing the flow rate response characteristics of the thermal type mass flow rate regulator, in the case wherein the flow rate response characteristics measuring device of FIG. 1 is used.
Figure 3:
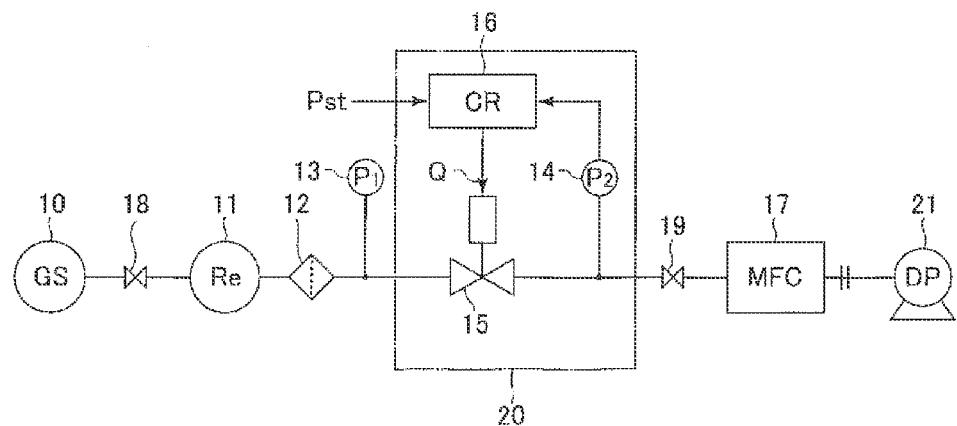
FIG. 3 is an explanatory diagram of a flow rate response characteristics measuring device for a thermal type mass flow rate regulator using an automatic pressure regulator.
Figure 4:
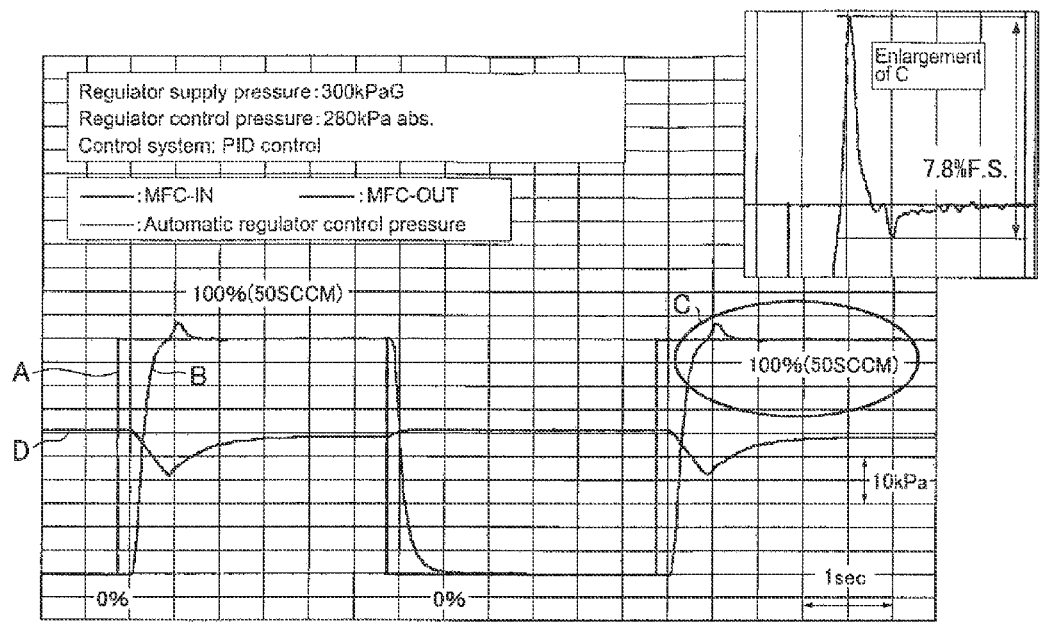
FIG. 4 is a diagram showing the flow rate response characteristics of the thermal type mass flow rate regulator in the case wherein the automatic pressure regulator of the flow rate response characteristics measuring device of FIG. 3 is set to perform a PID control action.
Figure 5:
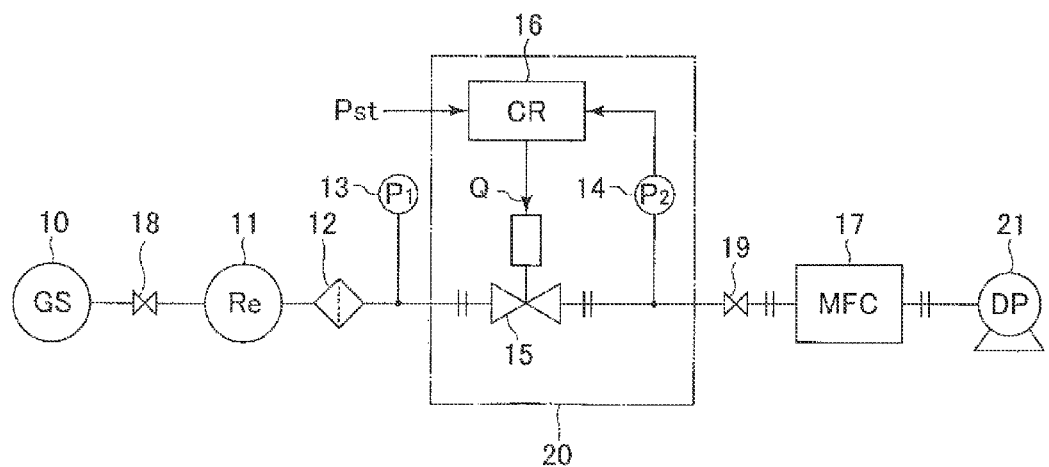
FIG. 5 is a schematic systematic diagram showing the configuration of an automatic pressure regulator for a flow rate regulator, according to the present invention.

Hereinafter, an embodiment of the present invention will be described with reference to the drawings. FIG. 5 shows an apparatus embodiment of the present invention. Note that FIG. 5 is different from the apparatus of FIG. 3 with respect to the point that the thermal type mass flow rate regulator 17 used is set to be at a full-scale (F.S.) flow rate of 10 SCCM and 500 SCCM, and with respect to the point that the controller 16 is capable of selecting any one of a PID control action and a control action for bringing about a residual deviation in control pressure by disabling an integral action.

In addition, as is publicly known, the PID control action is a control system in which control deviation in control pressure of the pressure regulating valve 15 converges to zero eventually, and a control action, in which an integral action is disabled, is a control system in which control deviation does not become zero, but converges so as to have a certain deviation (offset). In other words, PID control action achieves zero control deviation in the control pressure of the regulating valve 15, whereas control action in which integral action is disabled, the control deviation does not converge to zero but converges to an offset value.

Figure 6:
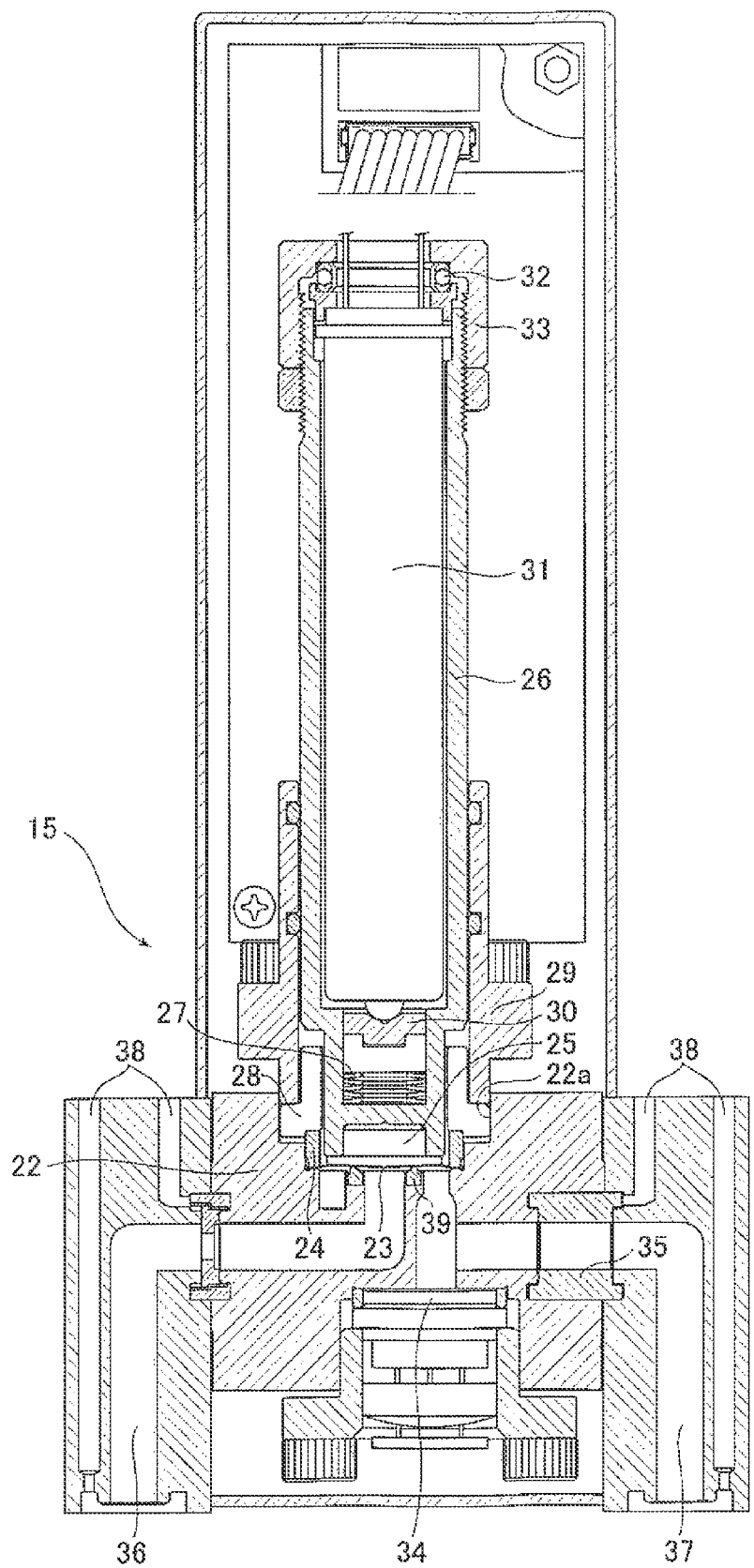
FIG. 6 is a cross-sectional schematic diagram of a pressure regulating valve used in the present invention.

FIG. 6 is a cross-sectional schematic diagram of the pressure regulating valve 15 that includes the automatic pressure regulator 20 according to the present invention, wherein the pressure regulating valve 15 is a so-called piezoelectrically driven metal diaphragm type control valve. That is, the main part of the pressure regulating valve 15 is composed of a stainless steel valve main body 22, a metal diaphragm valve element 23, a presser adapter 24, a tubular piezoelectric element support tube body 26 that is provided with a diaphragm presser 25 on its bottom end and has a bottom wall vertically attached by insertion into a hole part 22a of the valve main body 22, a disc spring 27 installed on the bottom wall of the support tube body 26, a split base 28 that presses the presser adapter 24, a tube body fixing/guiding body 29 that element 31, a positioning member 33 installed on the upper side of the support tube body 26, and the like. Furthermore, the valve main body 22 is provided with a gauge pressure sensor 34 that detects control pressure on the outlet side (secondary side) and a long gasket 35 that holds air tightness of the valve main body 22 (i.e., maintains a seal), and moreover, the valve main body 22 is provided with a fluid inlet 36, a fluid outlet 37, leak test holes 38, and the like, which are connected as shown in FIG. 6.

When no driving signal is input, the support tube body 26 is pressed downward by the elastic force of the spring 27, and the valve element 23 is brought to contact the valve seat 39 via the diaphragm presser 25 made of a resin sheet, to close the fluid passage. Furthermore, when a driving signal is input to the piezoelectric element 31, the piezoelectric element 31 is extended and the upper end of the piezoelectric element 31, whose bottom end is supported on the lower part receiving stand 30, moves upward, which lifts up the support tube body 26 upward against the elastic force of the spring 27. Consequently, the diaphragm presser 25 moves upward as well, and the valve element 23 is separated from the valve seat 39 to open the fluid passage. The main configuration of the pressure regulating valve 15 itself is publicly known, and is disclosed in, for example, Japanese Published Unexamined Patent Application No. 2003-120832, and the like. Therefore, a detailed description thereof will be omitted.

The controller 16, according to the invention, is used to compute a deviation between detected pressure $P_2$ obtained from the control pressure detector 14 and a set pressure Pst of the pressure regulating valve 15, and to supply a control signal Q proportional to the level of the deviation to the driving unit (i.e., piezoelectric element 31) of the pressure regulating valve 15. In accordance with the present invention, the controller 16 used is capable of switching between (1) a control action for bringing about a residual deviation in control pressure by disabling an integral action and (2) a PID control action employed as a control action in the proportional control system.

Figure 7:
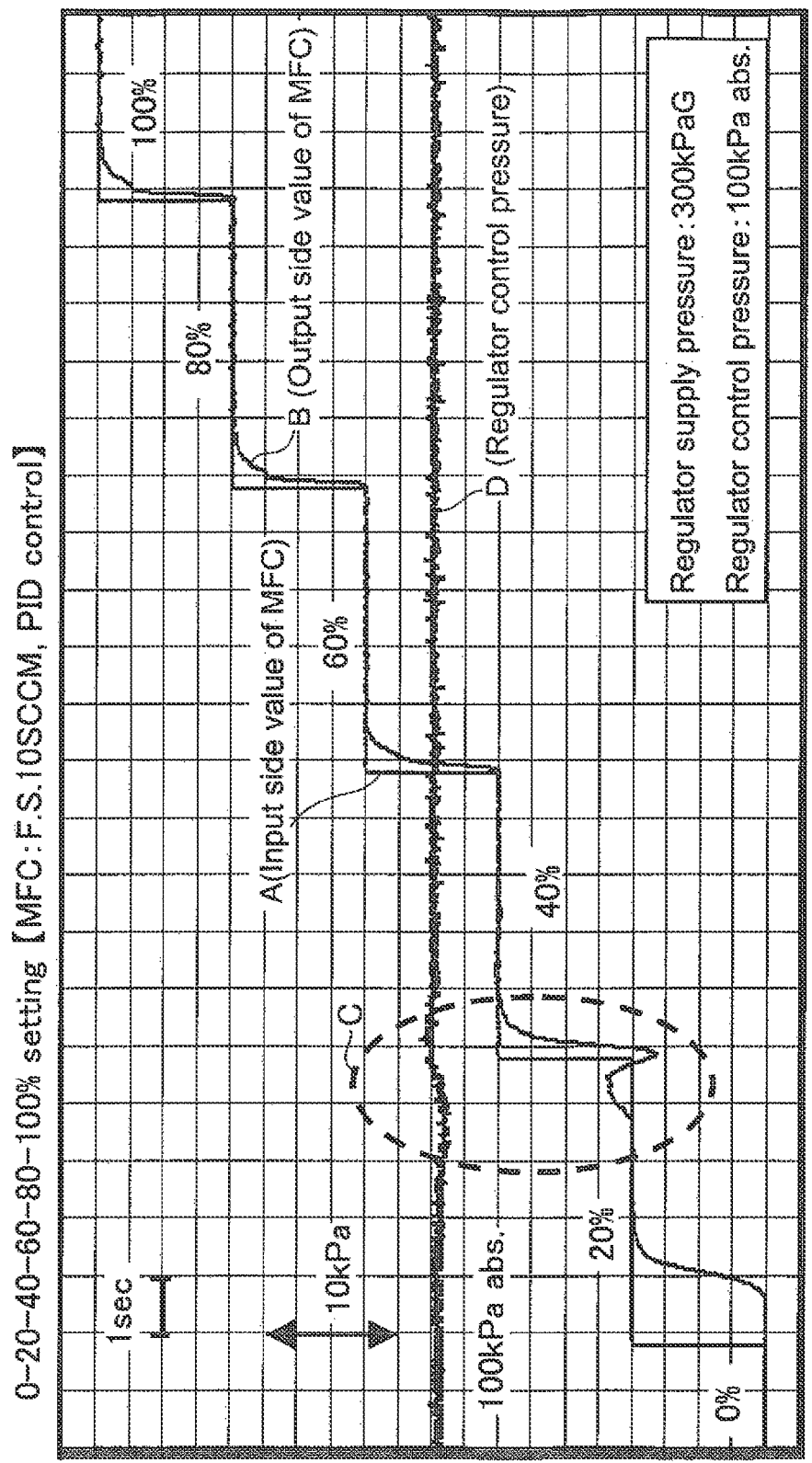
FIG. 7 shows an example of the flow rate response characteristics of a thermal type mass flow rate regulator (10 SCCM) in the case wherein the controller of the automatic pressure regulator, for the flow rate regulator according to the present invention, is set to perform a PID control action.

FIG. 7 shows input values and output values of the thermal type mass flow rate regulator 17 in the case wherein the flow rate setting of the thermal type mass flow rate regulator 17 is switched from 0 to 20%, and from 20 to 40%, and from 40 to 60%, and from 60 to 80%, and from 80 to 100% in a state in which the thermal type mass flow rate regulator 17, in FIG. 5, is set to be a full-scale (F.S.) flow rate of 10 SCCM, and the control pressure of the pressure regulating valve 15 is controlled to be 100 kPa (abs) using the controller 16 provided with a PID control action.

As is clear from the enlarged portion C in FIG. 7, a deflection is shown to occur in the pressure value on the output side of the thermal type mass flow rate regulator 17 when the control pressure D of the pressure regulating valve 15 is returned to the set value of 100 kPa (abs). This phenomenon was expected in advance by the inventors.

Figure 8:
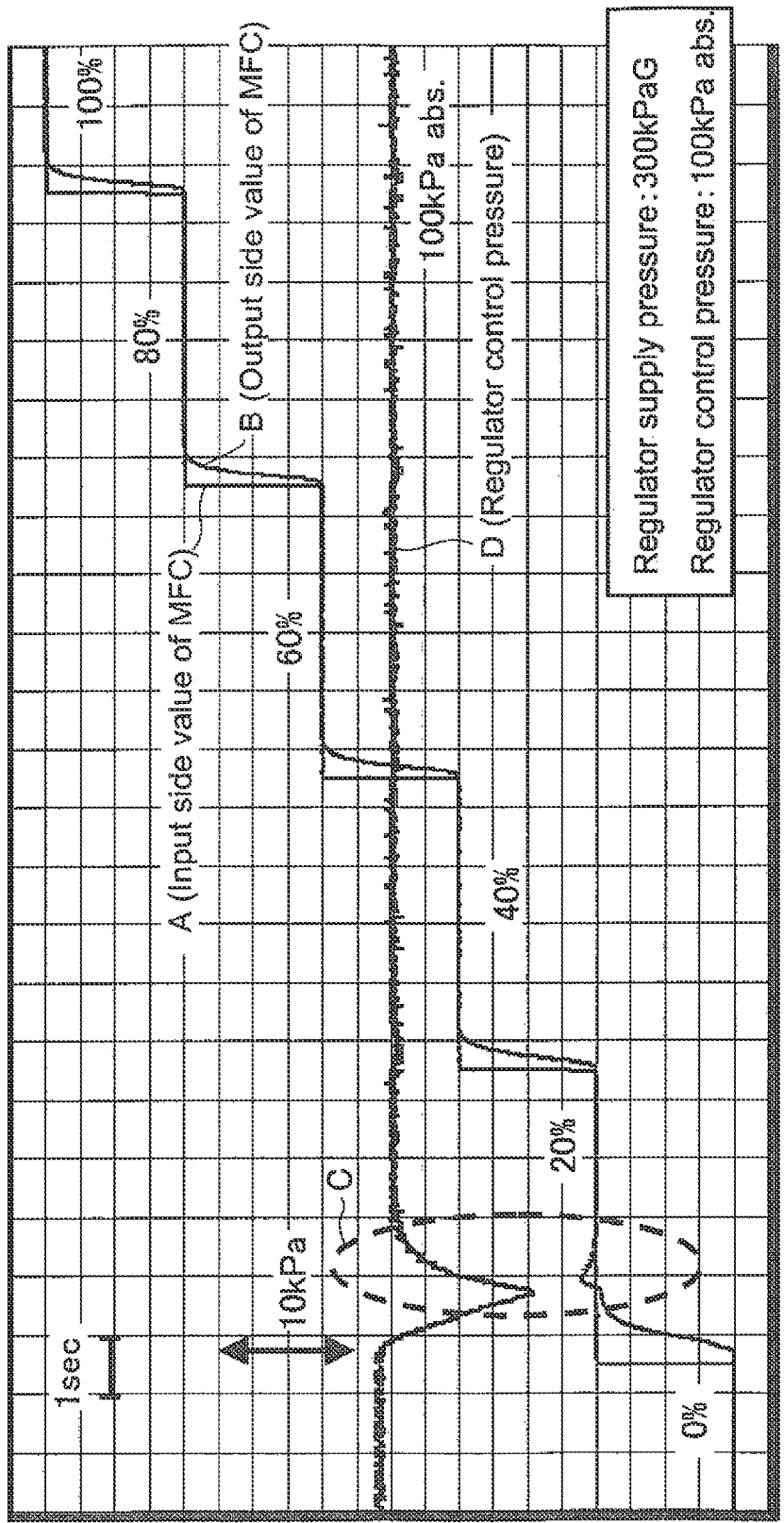
FIG. 8 shows an example of the flow rate response characteristics of a thermal type mass flow rate regulator (500 SCCM) in the case wherein the controller, of the automatic pressure regulator for the flow rate regulator according to the present invention, is set to perform a PID control action.

FIG. 8 shows measurement values in the case wherein the thermal type mass flow rate regulator 17 of FIG. 7 is replaced with one at a full-scale (F.S.) flow rate of 500 SCCM, which results in the same results as in the case of FIG. 7 (i.e., when the thermal type flow rate regulator 17 has a full-scale (F.S.) flow rate of 10 SCCM).

Figure 9:
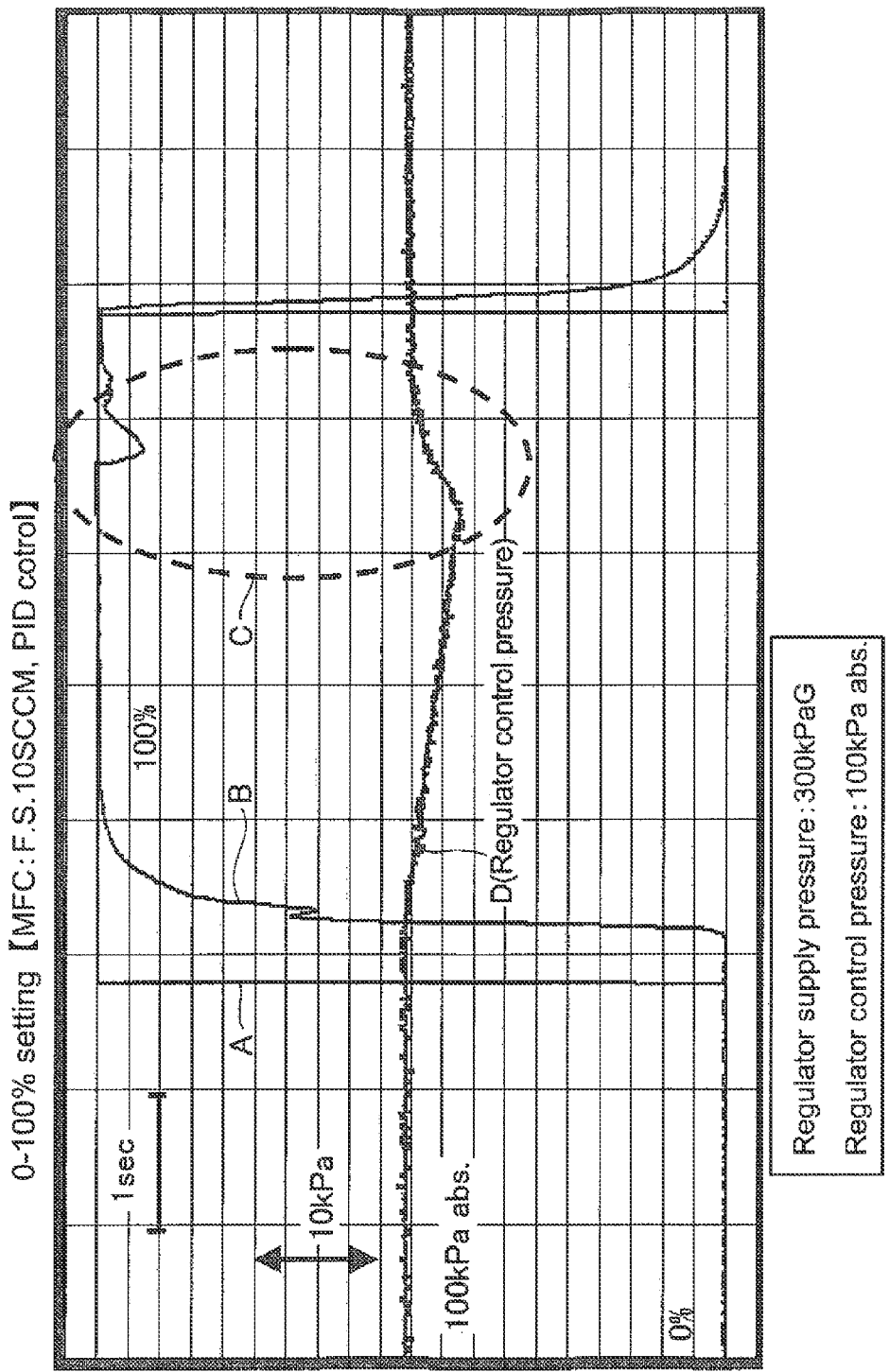
FIG. 9 shows another example of the flow rate response characteristics in the same way as in FIG. 7.

FIG. 9 shows the case wherein the flow rate setting of the thermal type mass flow rate regulator 17 is switched from 0 to 100% under the same conditions as in FIG. 7, in which a deflection occurs in output value of the thermal type mass flow rate regulator 17.

As is clear from FIGS. 7 to 9, in the case wherein the automatic pressure regulator 20 for the flow rate regulator is operated as a proportional control system with PID control action, a deflection occurs in output value B of the thermal type mass flow rate regulator 17 in any/each of the cases.

Figure 10:
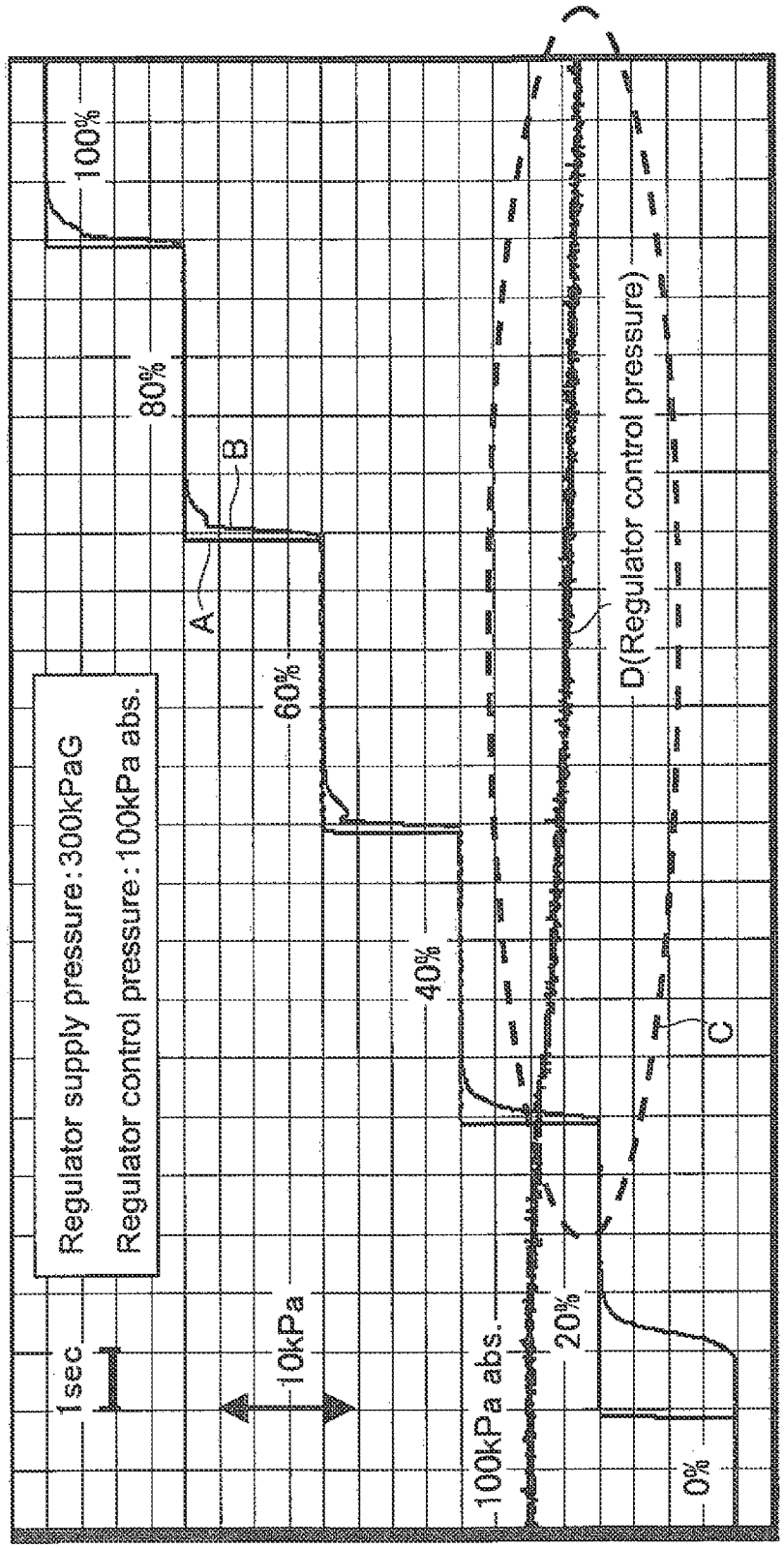
FIG. 10 shows an example of the flow rate response characteristics of a thermal type mass flow rate regulator (10 SCCM) in the case wherein the controller, of the automatic pressure regulator for the flow rate regulator according to the present invention, is set to perform a control action in which an integral action is disabled.

FIG. 10 shows the main part of the response characteristics of the automatic pressure regulator 20 for the flow rate regulator, according to the present invention. FIG. 10 also shows the test results in the case wherein the control action of the controller 16 is switched from PID control action to control action for bringing about a residual deviation (offset) in control pressure by disabling an integral action under the same test conditions as in FIG. 7. In FIG. 10, because an integral action is disabled, even when a deviation is brought about in control pressure D of the pressure regulating valve 15 by switching the flow rate, the deviation is not immediately returned to zero. As a result, a deflection does not occur in output value B of the thermal type mass flow rate regulator 17, and, as is clear from the test results, even when a deflection occurs, a ratio thereof with respect to the full-scale (F.S.) flow rate is extremely low, which results in no risk of having a harmful effect from a practical standpoint.

Figure 11:
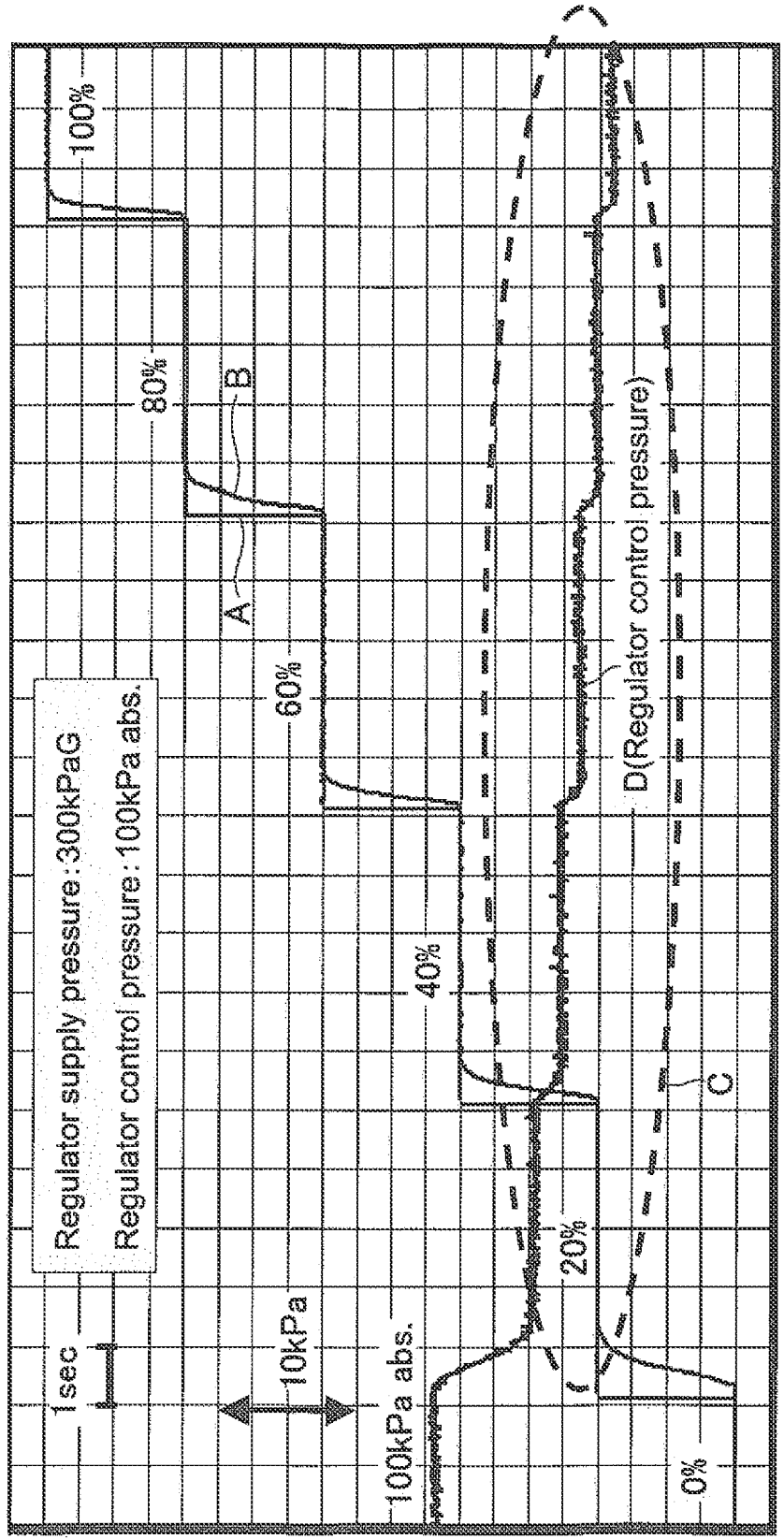
FIG. 11 shows an example of the flow rate response characteristics of a thermal type mass flow rate regulator (500 SCCM) in the case wherein the controller of the automatic pressure regulator, for the flow rate regulator according to the present invention, is set to perform a control action in which an integral action is disabled.

FIG. 11 shows the case wherein the thermal type mass flow rate regulator 17, as used in FIG. 10, is replaced with one at a full-scale (F.S.) flow rate of 500 SCCM and, in the same way as in the case of FIG. 10, a deflection hardly occurs in output value B of the thermal type mass flow rate regulator 17. That is, as shown by frame C, because the control pressure of the pressure regulating valve 15 is not returned to the value before switching, a deflection does not occur in output value of the thermal type mass flow rate regulator 17.

Figure 12:
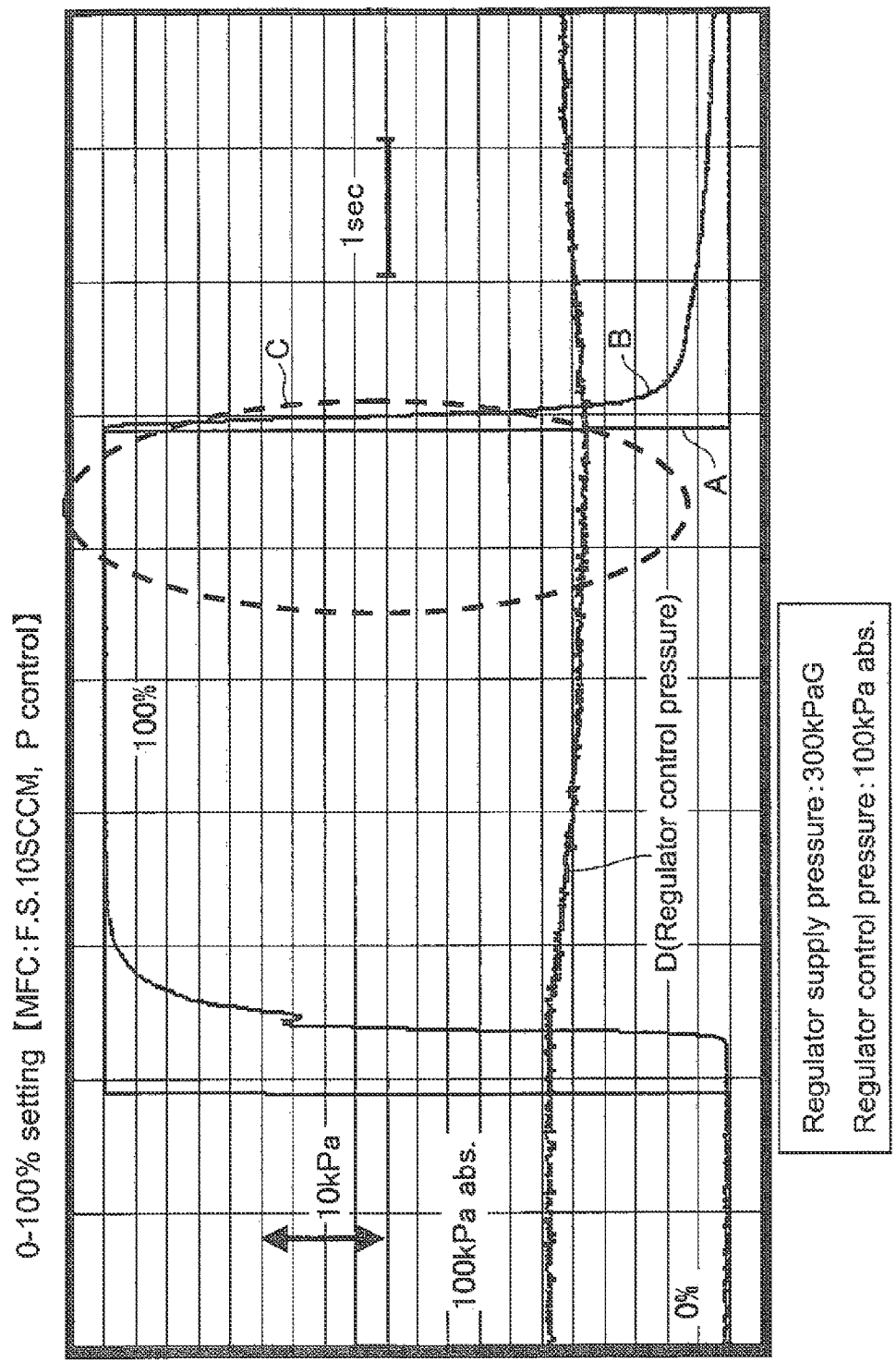
FIG. 12 shows another example of the flow rate response characteristics in the same way as in FIG. 10.
Figure 13:
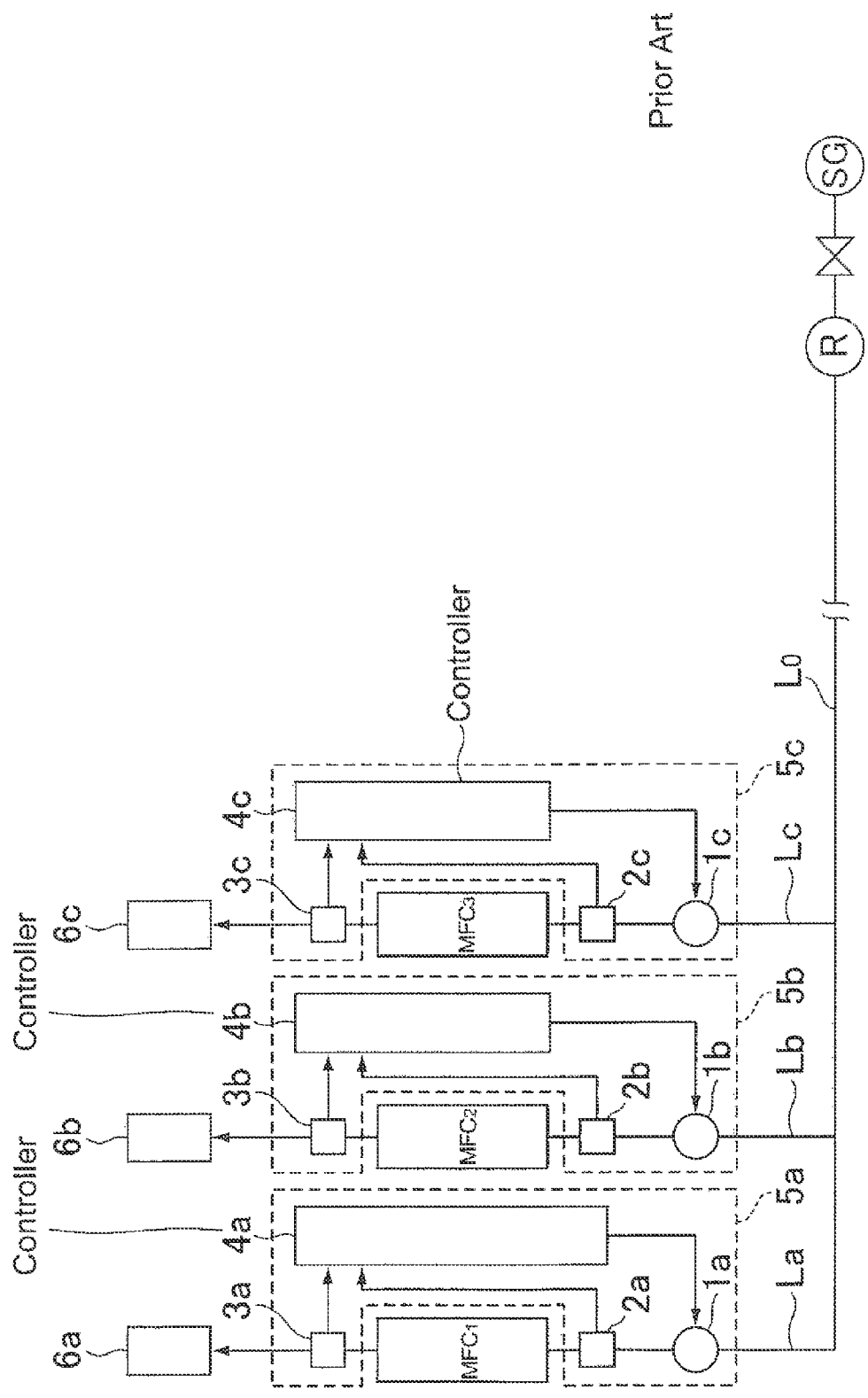
FIG. 13 is an explanatory diagram showing an example of a conventional automatic pressure regulator for a thermal type mass flow rate regulator.

FIG. 12 shows the case wherein the PID control action employed in FIG. 9 is switched to a control action in which the integral action is disabled. FIG. 12 shows that a deflection hardly occurs in the output value of the thermal type mass flow rate regulator 17 even in the case where the gas flow rate is switched from 0 to 100%.

In the respective embodiments of the invention, the full-scale (F.S.) flow rate of the thermal type mass flow rate regulator 17 is 10 SCCM or 500 SCCM. However, even when a full-scale (F.S.) flow rate is approximately 1 SCCM, similar flow rate characteristics were obtained. In the same way, with respect to the control pressure of the pressure regulating valve 15 as well, although the control pressure of the pressure regulating valve 15 is 100 kPa (abs) in the respective embodiments, the same flow rate characteristics were obtained even when the control pressure of the pressure regulating valve 15 is −0.07 to 0.7 MPaG.

In sum, then, the present invention prevents overshoot from occurring in the flow rate on the output side of the flow rate regulator in the case wherein the output flow rate on the output side is changed, or when the gas type to be distributed is changed. The present invention provides an automatic pressure regulator 20 to supply pressure of gas supplied to the flow rate regulator, including a piezoelectric element driving type pressure regulating valve 15, a control pressure detector 14 provided on the output side of the pressure regulating valve 15, and a controller 16 to which a detected value $P_2$ of the control pressure detector 14 and a set value Pst for control pressure are input. The controller 16 supplies a control signal to the piezoelectric element driving unit of the pressure regulating valve 15 by employing a proportional control system to perform regulation of opening of the valve, in which the proportional control system of the controller is set to control for bringing about a residual deviation in control pressure by disabling an integral action.

INDUSTRIAL APPLICABILITY

An automatic pressure regulator for a flow rate regulator, according to the present invention, may be broadly applied to a gas supply unit using a flow rate regulator in not only the field of semiconductor manufacturing, but also in the field of chemical product manufacturing, the field of pharmaceuticals manufacturing, and the like. Since overshoot does not occur on the output side of the flow rate regulator at the time of changing gas flow rate, or at the time of switching the supply gas type, even in gas supply at a minute flow rate, it is possible to perform highly accurate gas flow rate control.

The invention claimed is:

1. A combination of an automatic pressure regulator and a thermal type mass flow rate regulator, wherein the combination comprises:
   (a) an automatic pressure regulator that includes
      (i) a pressure regulating valve comprising a driving unit, wherein the pressure regulating valve has a range of control pressure of −0.07 MPaG to +0.7 MPaG;
      (ii) a control pressure detector disposed on an output side of the pressure regulating valve;
      (iii) a controller operably connected to receive as input a detected pressure value $P_2$ from the control pressure detector and a set value Pst as a control pressure; and
      (iv) a proportional control system, wherein the controller supplies a control signal to the driving unit of the pressure regulating valve using the proportional control system in order to perform opening regulation of the pressure regulating valve, wherein the proportional control system is a control provided with a proportional action that brings about a residual deviation in control pressure, and wherein the proportional action of the proportional control system brings about a residual deviation in the control pressure by disabling an integral control action from a state in which proportional-integral-derivative (PID) control is enabled; and
   (b) a thermal type mass flow rate regulator,
      wherein the automatic pressure regulator is operably connected to supply pressure of gas to an upstream side of the thermal type mass flow rate regulator, and
      wherein the automatic pressure regulator is disposed to regulate a flow rate of gas supplied to an apparatus for semiconductor manufacturing, chemical product manufacturing or pharmaceutical manufacturing, and the automatic pressure regulator is disposed to prevent an overshoot with respect to a temporal flow-in of gas supplied from the thermal type mass flow rate regulator from occurring when the flow rate of gas is changed or when the gas supplied from the thermal type mass flow regulator is switched to another type of gas.

2. The combination according to claim 1, wherein the pressure regulating valve is a piezoelectric element driving type metal diaphragm valve.

3. The combination according to claim 1, wherein the flow rate regulator operably connected to the automatic pressure regulator is disposed to supply gas to a vacuum chamber that has a vacuum of $10^1$ Torr to $10^{-5}$ Torr.

4. The combination according to claim 1, wherein a minimum rated flow rate of the flow rate regulator is 1 SCCM.

5. The combination according to claim 1, wherein the thermal type mass flow rate regulator is disposed to supply gas at a flow rate of 1 SCCM to 1000 SCCM to a vacuum chamber that has a vacuum of $10^1$ Torr to $10^{-5}$ Torr.

6. The combination according to claim 1, wherein a deflection in an output value of the thermal type mass flow rate regulator does not occur when a deviation is brought about in the control pressure of the pressure regulating valve by changing the flow rate of the gas.

7. The combination according to claim 1, wherein a deflection in an output value of the thermal type mass flow rate regulator is substantially zero when a deviation is brought about in the control pressure of the pressure regulating valve by changing the flow rate of the gas.

* * * * *